(12) United States Patent
Shapiro (10) Patent No.: US 10,333,942 B2
(45) Date of Patent: Jun. 25, 2019

(54) ENCODING LDAP ROLE AND DOMAIN INFORMATION IN A FIXED FORMAT

(71) Applicant: INTERNATIONAL BUSINESS MACHINES CORPORATION, Armonk, NY (US)

(72) Inventor: Ron S. Shapiro, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 295 days.

(21) Appl. No.: 14/325,926

(22) Filed: Jul. 8, 2014

(65) Prior Publication Data

US 2016/0014138 A1 Jan. 14, 2016

(51) Int. Cl.
*G06F 16/28* (2019.01)
*H04L 29/06* (2006.01)
*H04L 29/12* (2006.01)

(52) U.S. Cl.
CPC .......... *H04L 63/104* (2013.01); *G06F 16/282* (2019.01); *H04L 61/1523* (2013.01); *H04L 61/1552* (2013.01); *H04L 63/083* (2013.01)

(58) Field of Classification Search
CPC ............... H04L 63/104; H04L 61/1523; H04L 61/1552; H04L 63/083; G06F 17/30864; G06F 17/30589; G06F 16/282
See application file for complete search history.

(56) References Cited

U.S. PATENT DOCUMENTS

| 7,171,411 | B1* | 1/2007 | Lewis | G06F 21/604 |
| 7,865,959 | B1 | 1/2011 | Lewis | |
| 8,429,191 | B2 | 4/2013 | Desai et al. | |
| 8,578,442 | B1 | 11/2013 | Banerjee | |
| 2004/0078368 | A1* | 4/2004 | Excoffier | G06F 17/30961 |
| 2008/0052775 | A1* | 2/2008 | Sandhu | G06F 21/6263 726/14 |
| 2010/0241668 | A1* | 9/2010 | Susanto | G06F 21/305 707/784 |
| 2013/0297902 | A1* | 11/2013 | Collins | G06F 3/0605 711/163 |
| 2014/0343989 | A1* | 11/2014 | Martini | G06Q 10/063118 705/7.17 |

OTHER PUBLICATIONS

Hu et al, "Assessment of Access Control Systems Interagency Report 7316", Computer Security Division, Sep. 2006.

\* cited by examiner

*Primary Examiner* — Linglan E Edwards
*Assistant Examiner* — Forrest L Carey
(74) *Attorney, Agent, or Firm* — Griffiths & Seaton PLLC (57) ABSTRACT

Methods, computing systems and computer program products implement embodiments of the present invention that include associating one or more client domains with a computer executing an LDAP client, defining one or more client roles for each of one or more client domains, and associating one or more privileges with each of the client roles. Upon detecting a login of a client user having a client user name, the client user name is conveyed to an LDAP server, and in response, one or more client groups are received from the LDAP server, each given client group comprising a server role and a server domain. For each received client group having a respective server domain matching a given client domain, the respective server role is matched to a given client role, and the one or more privileges associated with the given client role is assigned to the client user.

17 Claims, 5 Drawing Sheets

ENCODING LDAP ROLE AND DOMAIN INFORMATION IN A FIXED FORMAT

FIELD OF THE INVENTION

The present invention relates generally to computer networking, and specifically to providing a consistent canonical syntax to encode Lightweight Directory Access Protocol (LDAP) groups for use by LDAP clients in communication with the LDAP server.

BACKGROUND

In a computer network, a Lightweight Directory Access Protocol (LDAP) server can be used to control user access to network resources and/or services. This is typically accomplished by defining multiple groups corresponding to the network resources, and assigning users to each the groups based on the resources they need to access. For example, subsequent to defining a database administrator (DBA) group and a mail server group, a first user can be assigned to the DBA group, a second user can be assigned to the mail server group, and a third user can be assigned to both of the groups. By querying, via an LDAP client, the LDAP server, an application associated with a given resource (e.g., a database server) can determine if a given user can access the given resource.

The description above is presented as a general overview of related art in this field and should not be construed as an admission that any of the information it contains constitutes prior art against the present patent application.

SUMMARY

There is provided, in accordance with an embodiment of the present invention a method, including associating one or more client domains with a computer executing a Lightweight Directory Access Protocol (LDAP) client, defining, by the computer, one or more client roles for each of one or more client domains, associating one or more privileges with each of the client roles, detecting a login of a client user having a client user name, conveying the client user name to an LDAP server, receiving, from the LDAP server, one or more client groups, each given client group comprising a server role and a server domain, and for each received client group having a respective server domain matching a given client domain, matching the respective server role to a given client role, and assigning, to the client user, the one or more privileges associated with the given client role.

There is also provided, in accordance with an embodiment of the present invention a computing facility, including a communications network, a first computer executing a Lightweight Directory Access Protocol (LDAP) server application and coupled to the communications network, and a second computer coupled to the communications network, and configured to execute an LDAP client application, to associate one or more client domains with the second computer, to define one or more client roles for each of one or more client domains, to associate one or more privileges with each of the client roles, to detect a login of a client user having a client user name, to convey the client user name to the first computer, to receive from the first computer, one or more client groups, each given client group comprising a server role and a server domain, and for each received client group having a respective server domain matching a given client domain, to match the respective server role to a given client role, and to assign, to the client user, the one or more privileges associated with the given client role.

There is further provided, in accordance with an embodiment of the present invention a computer program product, the computer program product including a non-transitory computer readable storage medium having computer readable program code embodied therewith, the computer readable program code including computer readable program code configured to execute a Lightweight Directory Access Protocol (LDAP) client, computer readable program code configured to associate one or more client domains with a computer executing the LDAP client, computer readable program code configured to define, one or more client roles for each of one or more client domains, computer readable program code configured to associate one or more privileges with each of the client roles, computer readable program code configured to detect a login of a client user having a client user name, computer readable program code configured to convey the client user name to an LDAP server, computer readable program code configured to receive, from the LDAP server, one or more client groups, each given client group comprising a server role and a server domain, and for each received client group having a respective server domain matching a given client domain, computer readable program code configured to match the respective server role to a given client role, and computer readable program code configured to assign, to the client user, the one or more privileges associated with the given client role.

BRIEF DESCRIPTION OF THE DRAWINGS

The disclosure is herein described, by way of example only, with reference to the accompanying drawings, wherein.

DETAILED DESCRIPTION OF EMBODIMENTS

Embodiments of the present invention provide systems and methods for implementing a canonical syntax for encoding role and domain information in a Lightweight Directory Access Protocol (LDAP) server in communication, via a network, with a computer executing an LDAP client. In some embodiments the canonical syntax may comprise predefined sets of roles and associated domains that can be used to define an entry in an LDAP table.

In embodiments herein, a given domain may comprise one or more computers and/or devices on a network that are administered as a unit with common rules and procedures. For example, if the set of domains comprises "DB_Server" (a database service) and "Mail_Server" (an email service), and the set of roles comprises "ReadOnly", "ReadWrite" and "Admin", embodiments of the present invention can define a group by using a given domain from the set of domains and a given role from the set of roles. Therefore to assign, to a given user, administrator privileges to a database domain, a group can be defined comprising the text "Admin@DB_Server", wherein the text indicates a role ("Admin") for a domain ("DB_Server"), and the group can be associated with the user.

As explained hereinbelow, to initialize a given LDAP client, one or more client domains can be associated with a computer executing the LDAP client, one or more client roles can be defined for each of one or more client domains, and one or more privileges can be associated with each of the roles. Upon detecting a login of a user having a given user name, a query comprising the user name can be sent to an LDAP server, and in response to the query, one or more groups can be received from the LDAP server, wherein each given group comprises a server role and a server domain. For each received group having a respective server domain matching a given client domain, the respective server role can be matched to a given client role, and the one or more privileges associated with the given client role can be assigned to the user.

In some embodiments, a given privilege may comprise a command associated with the role. For example, for a "Read-Only" role may have privileges "list" and "get". In other words, a user having read-only privileges in a database domain, will be authorized to execute "list" and "get" operations on databases in the database domain.

When defining groups defining access rights, encoding both the role and the domain in a fixed format, enables an application to easily verify a given user's rights to the application. In some embodiments, the application can query a specific role. In alternative embodiments the application can query for all the roles associated with a given server domain (or a given service, or a given application). Therefore, by using a consistent syntax when defining LDAP table entries, groups defined using embodiments of the present invention can be easy to maintain, and amenable to machine checking, both for syntactic correctness and for enforcement by the relevant service.

Figure 1:
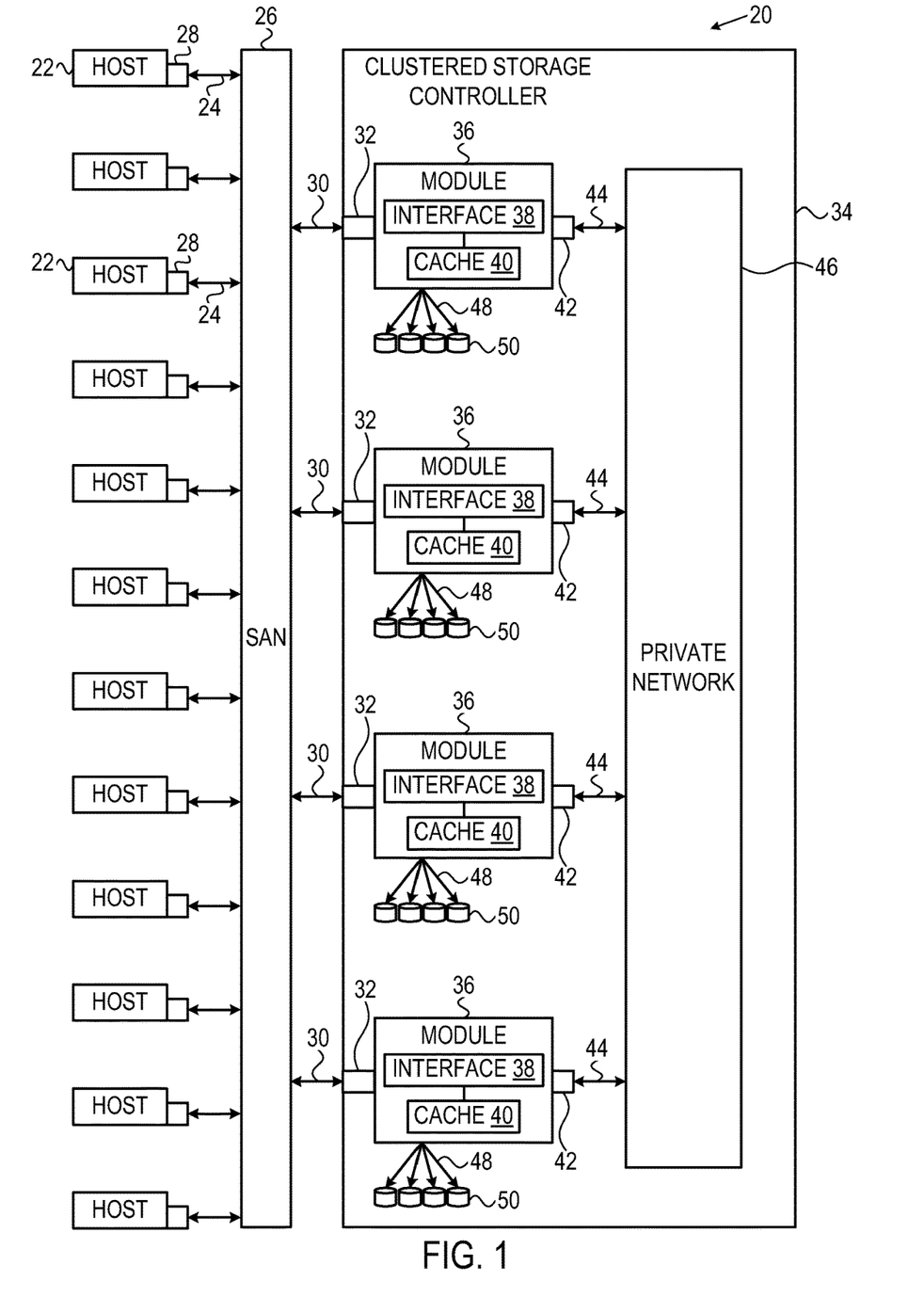
FIG. 1 is a block diagram that schematically illustrates a storage system comprising a storage controller, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Figure 2:
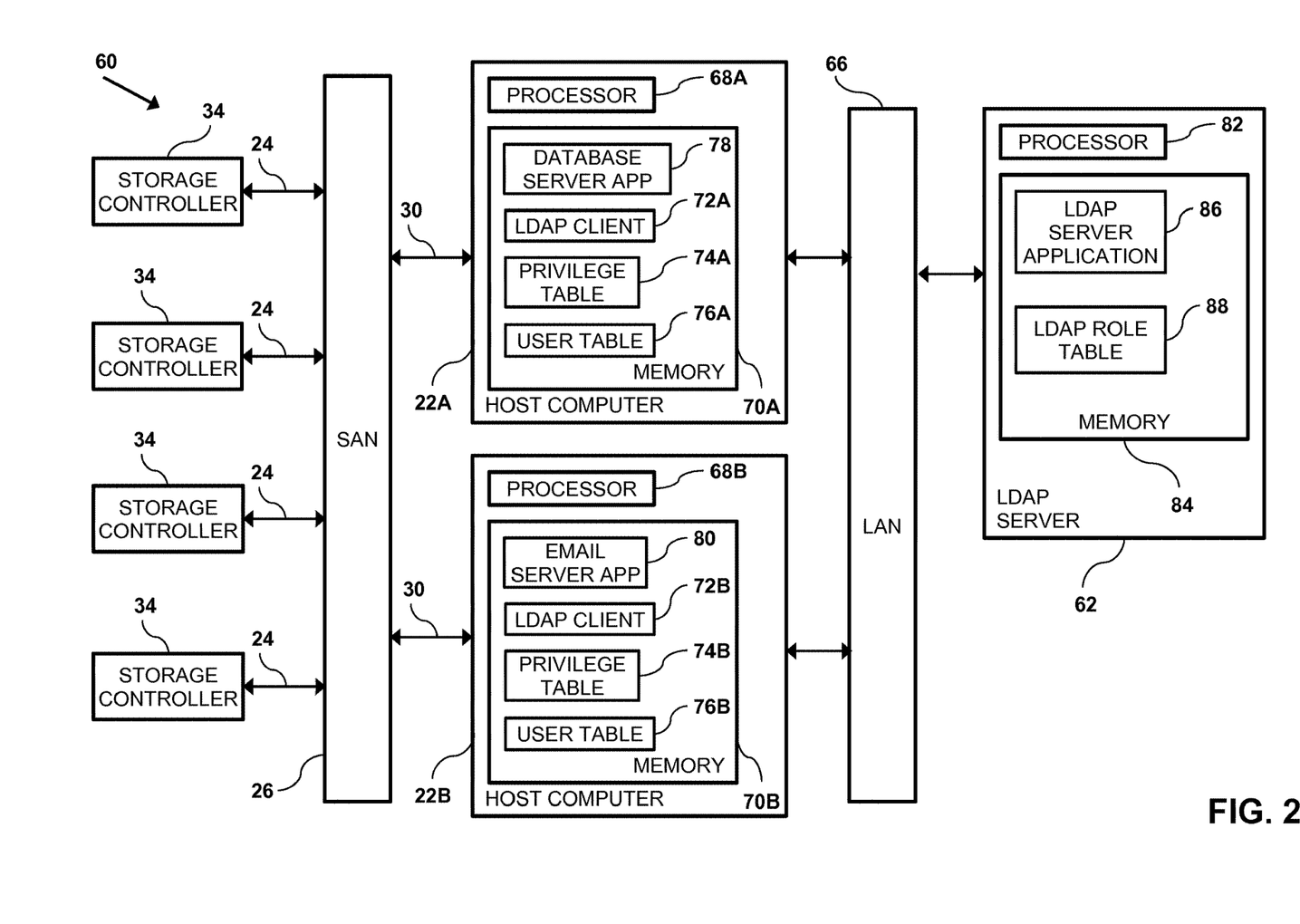
FIG. 2 is a block diagram that schematically illustrates a first computing facility comprising a Lightweight Directory Access Protocol (LDAP) server configured to encode role and domain information in a fixed format, in accordance with a first embodiment of the present invention.

FIG. 2 is a block diagram that schematically illustrates a computing facility 60 comprising an LDAP server computer 62 (also referred to herein as a first computer) to encode role and domain information in a fixed format, in accordance with an embodiment of the present invention. As the configuration in FIG. 2 shows, facility 60 also comprises host computers 22 (also referred to herein as second computers) coupled to LDAP server 62 via a local area network (LAN) 66. While the configuration in FIG. 2 shows computers 22 and 62 communicating over LAN 66, the computers coupling to, and communicating over any type of communications network is considered to be within the spirit and scope of the present invention. In operation, host computers 22 can store data to storage controllers 34 via SAN 26.

In the configuration shown in FIG. 2, host computers 22 and their respective components can be differentiated by appending a letter to the identifying numeral, so that the host computers comprise host computers 22A and 22B. Each host computer comprises a host processor 68 and a host memory 70. Processor 68 executes, an LDAP client 72 from host memory 70, and the host memory stores a privilege table 74 and a user table 76.

In addition to the LDAP client, processor 68A executes a database server application 78 from memory 70A, and processor 68B executes an email server application 80 from memory 70B. Therefore, in embodiments herein, host computer 22A may also be referred to as a database server, and host computer 22B may also be referred to as an email server.

LDAP client 72 comprises a software application that enables processor 68 to communicate with LDAP server 62. As explained hereinbelow, privilege table 74A stores roles and respective privileges associated with database server application 78, and user table 76A stores users currently logged into the database server application. Likewise, privilege table 74B stores roles and respective privileges associated with email server application 80, and user table 76B stores users currently logged into the email server application.

In embodiments herein, each LDAP client 72 can be associated with one or more domains, and a given user may have different privileges in different domains managed by a given LDAP client. For example database server application 78 may manage multiple financial databases in a financial database domain and multiple legal databases in a legal database domain, and a given user may have read/write privileges in the financial database domain and read-only privileges in the legal database domain.

LDAP server 62 comprises a server processor 82 and a server memory 84. Processor 82 executes an LDAP server application 86 from memory 84, and the server memory stores a LDAP role table 88. LDAP role table 88 stores valid roles for each of the domains in facility 60, thereby enabling the facility to enforce a consistent syntax when defining groups. As described supra, each given group comprises a given role and a given domain.

Processors 68 and 82 may comprise general-purpose central processing units (CPUs) or a special-purpose embedded processors, which is programmed in software or firmware to carry out the functions described herein. The software may be downloaded to computers 22 and 62 in electronic form, over a network, for example, or it may be provided on non-transitory tangible media, such as optical, magnetic or electronic memory media. Alternatively, some or all of the functions of the processor may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Managing Canocically Defined Groups

Figure 3:
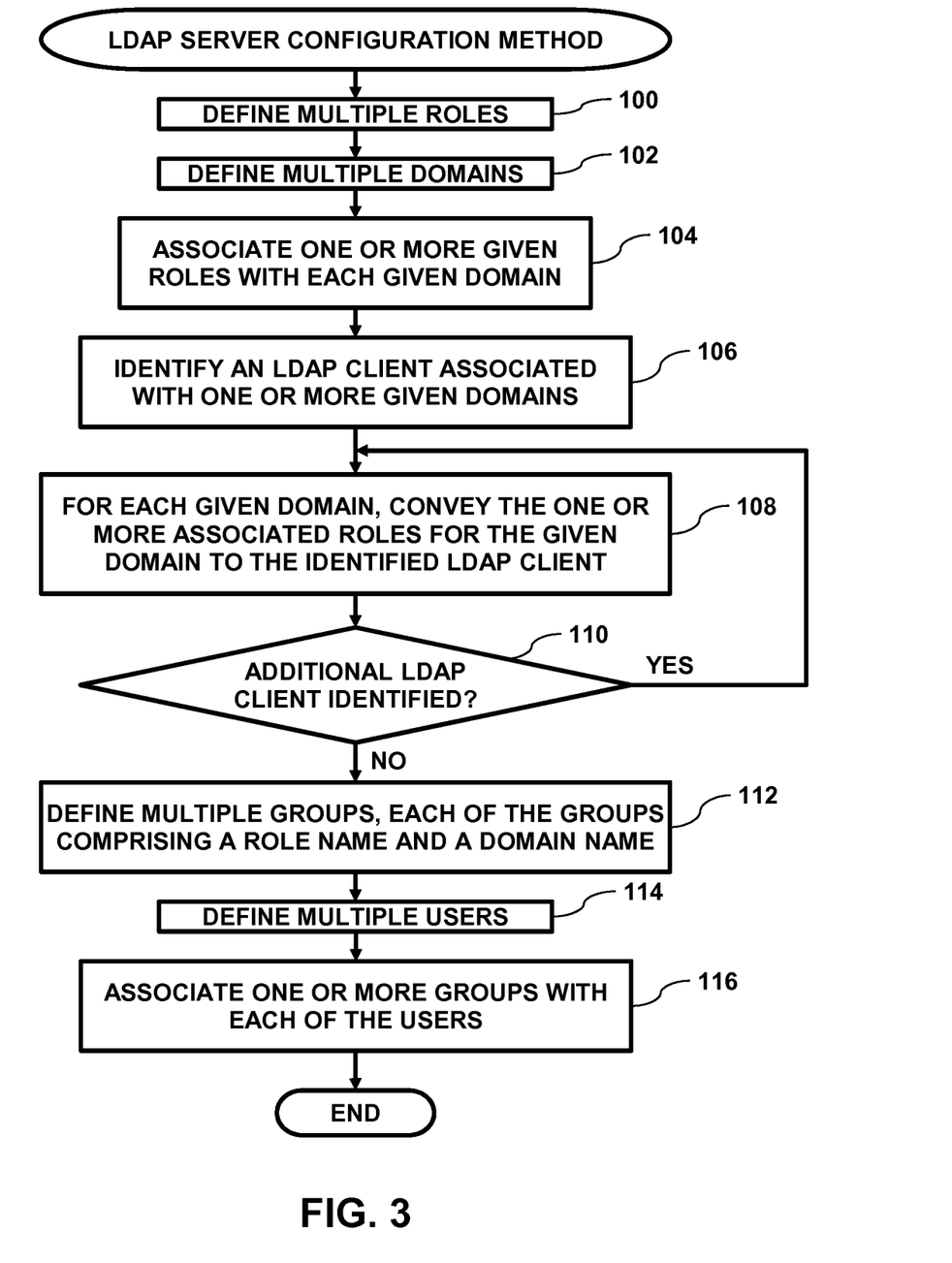
FIG. 3 is a flow diagram that schematically illustrates a method of configuring the LDAP server, in accordance an embodiment of the present invention.

FIG. 3 is a flow diagram that schematically illustrates a method of managing metadata to configure LDAP server 62, in accordance with an embodiment of the present invention. In embodiments described herein, the users, user names, groups, and roles manipulated by or associated with a processor 82 may also be referred to respectively as server domains, server users, server user names, server groups and server roles.

In a first definition step 100, processor 82 defines multiple roles, and in a second definition step 102, the server processor defines multiple domains. In a first association step 104, the server processor associates one or more of the defined roles with each of the defined domains, and stores each combination of domains and their respective associated roles to LDAP role table 88. Defining roles and their associated domains enables facility 60 to implement a consistent canonical syntax when defining groups, wherein each group comprises a given role and a given domain. To define the domains and the roles, processor 82 can accept an input or retrieve the domains and the roles from a configuration file (not shown).

In an identification step 106, processor 82 identifies a given host computer executing an LDAP client and associated with one or more given domains, and in convey step 108, the processor conveys, to the given host computer, any entries in LDAP role table 88 that include the one or more domains. In other words, for each given domain, processor 82 conveys the one or more roles associated with the associated domain(s) to the given host computer.

In a comparison step 110, if processor 82 identifies an additional host computer 22 executing LDAP client 72, then the method continues with step 108. If processor 82 fails to identify an additional host computer 22 executing LDAP client 72, then the server processor defines multiple groups in a third definition step 112. As described supra, each of the groups comprises a role name and a group name. To define the groups, processor 82 can accept an input or retrieve the group definitions from a configuration file (not shown).

In a fourth definition step 114, processor 82 defines multiple users (e.g., via a configuration file), in a second association step 116, the server processor associates one or more groups with each of the users, and the method ends.

The association defined in step 116 is typically bidirectional. In other words, one or more users can be associated with a given group, and one or more groups can be associated with a given user.

Figure 4:
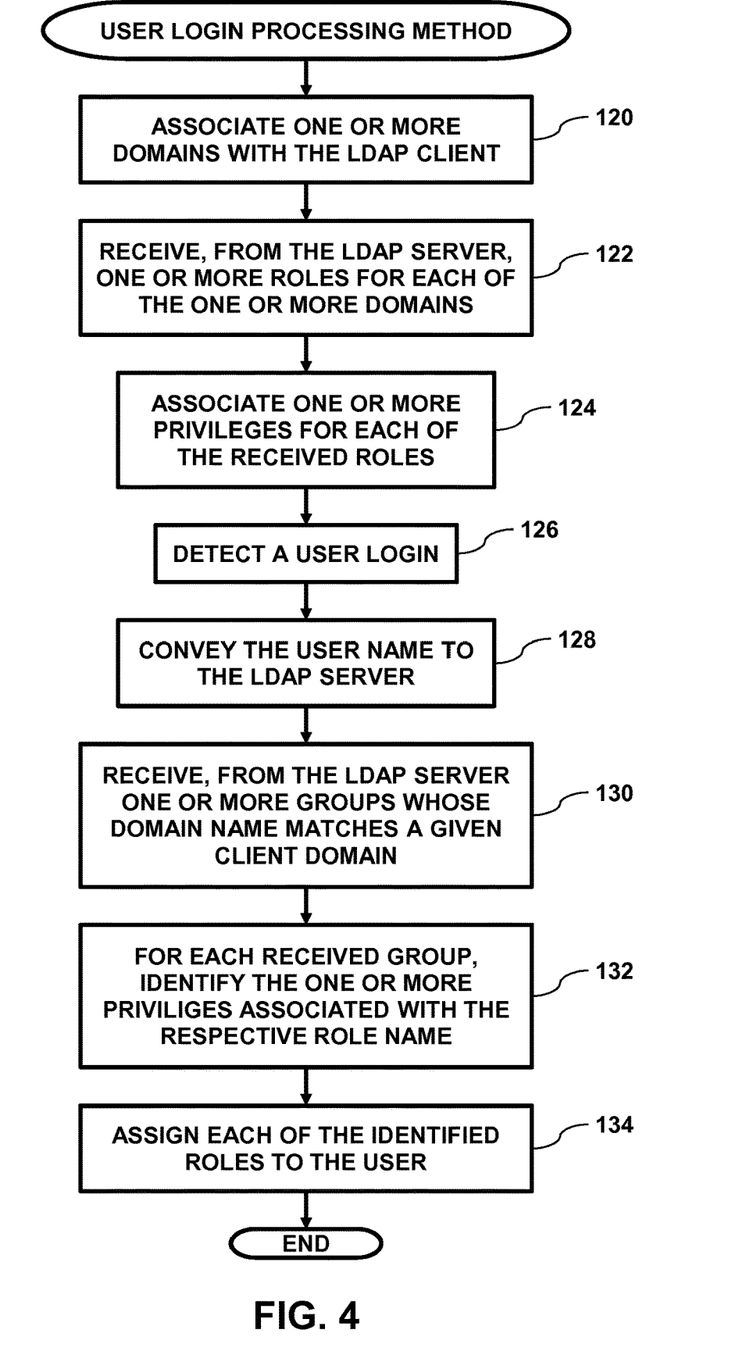
FIG. 4 is a flow diagram that schematically illustrates a method of processing a user login on an LDAP client, in accordance with an embodiment of the present invention.

FIG. 4 is a flow diagram that schematically illustrates a method of processing a user login to a given host computer 22, in accordance an embodiment of the present invention. In embodiments described herein, the users, user names, groups, and roles manipulated by or associated with a given processor 68 may also be referred to respectively as client domains, client users, client user names, client groups and client roles. Additionally, the client domains are included in the server domains, the client users are included in the server users, the client user names are included in the server user names, the client groups are included in the server groups, the client domains are included in the server domains, and the client roles are included in the server roles.

In a first association step 120, a given processor 68 (i.e., of the given host computer) associates one or more domains with the LDAP client application executing on the given host processor, and in a first receive step 122, the given host processor receives, from LDAP server 62, one or more roles for each of the associated one or more domains. In a second association step 124, the given host processor associates on or more privileges with each of the received roles, and stores each combination of a given role and a given respective privilege to a given entry in privilege table 74.

Upon detecting a user login comprising a client user name in a login step 126, the given host processor conveys a request comprising the client user name to LDAP server 62 in a convey step 128. Upon receiving the client user name from the given host processor executing a given LDAP client 72, the server processor identifies one or more server groups whose associated server user name matches the received client user name (the one or more identified entries having respective one or more server groups), and conveys the respective one or more server groups of the identified entries to the LDAP client. In a second receive step 130, the given host processor receives, from LDAP server 62 in response to the request, one or more groups, each of the one or more groups storing the user name and a server domain that matches one of the one or more client domains.

In operation LDAP server will typically convey, in response to receiving the request, all the global groups associated with the user. Therefore, in step 130, the given host processor can receive the one or more local groups that are associated with the user by receiving all the groups associated with the user, and extracting the groups whose respective server domain matches on of the one or more client domains.

In an identification step 132, for each received group, the given host processor extracts the received group's role, identifies, in a given entry in privilege table 74, the one or more privileges associated with the extracted role. Finally, in an assign step 134 assigns the one or more identified privileges to the user, and the method ends.

Figure 5:
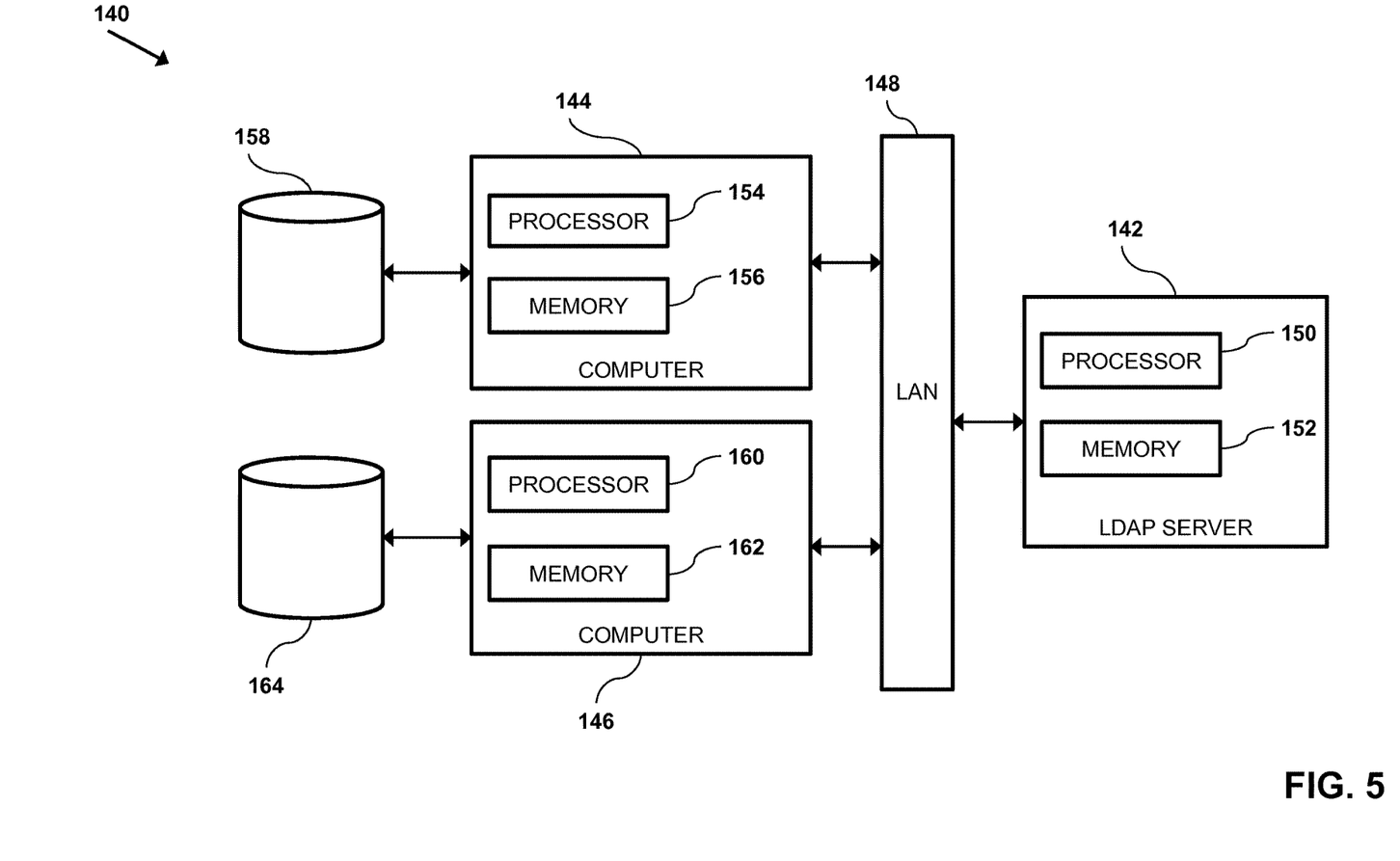
FIG. 5 is a block diagram that schematically illustrates a second computing facility configured to encode role and domain information in a fixed format, in accordance with an alternative embodiment of the present invention.

FIG. 5 is a block diagram that schematically illustrates a second computing facility 140 configured to encode role and domain information in a fixed format, in accordance with an alternative embodiment of the present invention. Computing facility 140 comprises an LDAP server computer 142 that communicates with computers 144 and 146 over a LAN 148. Elements of Facility 140 can be used to implement embodiments of the present invention as described in FIGS. 3 and 4 hereinabove. LDAP server 142 comprises a processor 150 and a memory 152. In operation, processor 150 and memory 152 are configured to carry out the functions performed by processor 82 and memory 82 as described supra.

Computer 144 comprises a processor 154, a memory 156 and a storage device 158. In operation, processor 154 and memory 156 are configured to carry out the functions performed by processor 68A and memory 70A as described supra. In embodiments where computer 144 is configured as a database server, processor 154 can store database metadata and data on storage device 158.

Computer 146 comprises a processor 160, a memory 162 and a storage device 164. In operation, processor 160 and memory 152 are configured to carry out the functions performed by processor 68B and memory 70B as described supra. In embodiments where computer 146 is configured as an email server, processor 154 can store email metadata and data on storage device 164.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:

associating one or more client domains with a computer executing a Lightweight Directory Access Protocol (LDAP) client, the one or more client domains comprised of multiple hosts, including the computer, on a network which are administered as a unit having common rules and procedures including providing, as the one or more client domains, at least one of a database service and an email service;

defining, by the computer, one or more client roles for each of one or more client domains, the one or more client roles including at least a read only role, a read and write role, and an administrator role; wherein each of the one or more client roles are encoded in a specific canonically-defined syntax as an entry in an LDAP user table;

associating one or more privileges with each of the client roles, the one or more privileges each comprising one or more executable commands to which a client user associated with one of the respective client roles is authorized to perform; wherein an application verifies the one or more privileges associated with the one or more client roles for the application by querying a respective entry in the LDAP user table, including querying both for syntactic correctness of the specific canonically-defined syntax and privilege role enforcement of the one or more privileges;
detecting a login of the client user having a client user name;
conveying the client user name to an LDAP server;
receiving, from the LDAP server, one or more client groups, each given client group comprising a server role and a server domain;
for each received client group having a respective server domain matching a given client domain:
matching the respective server role to a given client role; and
assigning, to the client user, the one or more privileges associated with the given client role; and
prior to defining the one or more client roles, defining by the LDAP server, multiple server domains, defining multiple server roles, and associating one or more given server roles with each of the multiple server domains.

2. The method according to claim 1, wherein each of the one or more client domains comprises a given server domain, and wherein each of the one or more client roles comprises a given client role, and comprising conveying, to the LDAP client, the one or more client domains and the one or more client roles for each of one or more client domains.

3. The method according to claim 2, and comprising defining, by the LDAP server, multiple server users, each of the server users having a server user name, wherein the client user comprises a given server user, and wherein the client user name comprises a given server user name.

4. The method according to claim 3, and comprising defining multiple server groups, each of the server groups comprising a given server role and a given server domain wherein each of the one or more client groups comprises a given server group.

5. The method according to claim 4, and comprising defining, by the LDAP server, the LDAP user table comprising multiple entries, each of the entries comprising a given server user name, a given server role and a given server domain.

6. The method according to claim 5, and comprising upon receiving the client user name from the LDAP client, identifying, by the LDAP server, one or more of the entries whose server user name matches the client user name, the one or more identified entries having respective one or more server groups, and conveying the respective one or more server groups to the LDAP client, wherein the received one or more client groups comprises the one or more conveyed server groups.

7. A computing facility, comprising:
a communications network;
a first computer executing a Lightweight Directory Access Protocol (LDAP) server application and coupled to the communications network; and
a second computer coupled to the communications network, and configured:
to execute an LDAP client application,
to associate one or more client domains with the second computer, the one or more client domains comprised of multiple hosts, including the second computer, on the communications network which are administered as a unit having common rules and procedures including providing, as the one or more client domains, at least one of a database service and an email service,
to define one or more client roles for each of one or more client domains, the one or more client roles including at least a read only role, a read and write role, and an administrator role; wherein each of the one or more client roles are encoded in a specific canonically-defined syntax as an entry in an LDAP user table,
to associate one or more privileges with each of the client roles, the one or more privileges each comprising one or more executable commands to which a client user associated with one of the respective client roles is authorized to perform; wherein an application verifies the one or more privileges associated with the one or more client roles for the application by querying a respective entry in the LDAP user table, including querying both for syntactic correctness of the specific canonically-defined syntax and privilege role enforcement of the one or more privileges,
to detect a login of the client user having a client user name,
to convey the client user name to the first computer,
to receive from the first computer, one or more client groups, each given client group comprising a server role and a server domain,
for each received client group having a respective server domain matching a given client domain:
to match the respective server role to a given client role, and
to assign, to the client user, the one or more privileges associated with the given client role,
wherein, prior to defining the one or more client roles, the first computer is configured to define multiple server domains, to define multiple server roles, and to associate one or more given server roles with each of the multiple server domains.

8. The computing facility according to claim 7, wherein each of the one or more client domains comprises a given server domain, and wherein each of the one or more client roles comprises a given client role, and wherein the first computer is configured to convey, to the second computer, the one or more client domains and the one or more client roles for each of one or more client domains.

9. The computing facility according to claim 8, wherein the first computer is configured to define multiple server users, each of the server users having a server user name, wherein the client user comprises a given server user, and wherein the client user name comprises a given server user name.

10. The computing facility according to claim 9, wherein the first computer is configured to define multiple server groups, each of the server groups comprising a given server role and a given server domain wherein each of the one or more client groups comprises a given server group.

11. The computing facility according to claim 10, wherein the first computer is configured to define the LDAP user table comprising multiple entries, each of the entries comprising a given server user name, a given server role and a given server domain.

12. The computing facility according to claim 11, wherein upon receiving the client user name from the second computer, the first computer is configured to identify one or more of the entries whose server user name matches the client user name, the one or more identified entries having respective one or more server groups, and to convey the respective one or more server groups to the LDAP client, wherein the received one or more client groups comprises the one or more conveyed server groups.

13. A computer program product, the computer program product comprising:
a non-transitory computer readable storage medium having computer readable program code embodied therewith, the computer readable program code comprising:
computer readable program code configured to execute a Lightweight Directory Access Protocol (LDAP) client;
computer readable program code configured to associate one or more client domains with a computer executing the LDAP client, the one or more client domains comprised of multiple hosts, including the computer, on a network which are administered as a unit having common rules and procedures including providing, as the one or more client domains, at least one of a database service and an email service;
computer readable program code configured to define, one or more client roles for each of one or more client domains, the one or more client roles including at least a read only role, a read and write role, and an administrator role; wherein each of the one or more client roles are encoded in a specific canonically-defined syntax as an entry in an LDAP user table;
computer readable program code configured to associate one or more privileges with each of the client roles, the one or more privileges each comprising one or more executable commands to which a client user associated with one of the respective client roles is authorized to perform; wherein an application verifies the one or more privileges associated with the one or more client roles for the application by querying a respective entry in the LDAP user table, including querying both for syntactic correctness of the specific canonically-defined syntax and privilege role enforcement of the one or more privileges;
computer readable program code configured to detect a login of the client user having a client user name;
computer readable program code configured to convey the client user name to an LDAP server;
computer readable program code configured to receive, from the LDAP server, one or more client groups, each given client group comprising a server role and a server domain;
for each received client group having a respective server domain matching a given client domain:
computer readable program code configured to match the respective server role to a given client role; and
computer readable program code configured to assign, to the client user, the one or more privileges associated with the given client role; and
computer readable program code executing on the LDAP server and configured, prior to defining the one or more client roles, to define multiple server domains, to define multiple server roles, and to associate one or more given server roles with each of the multiple server domains.

14. The computer program product according to claim 13, wherein each of the one or more client domains comprises a given server domain, and wherein each of the one or more client roles comprises a given client role, and comprising computer readable program code executing on the LDAP server and configured to conveying, to the LDAP client, the one or more client domains and the one or more client roles for each of one or more client domains.

15. The computer program product according to claim 14, and comprising computer readable program code executing on the LDAP server and configured to define multiple server users, each of the server users having a server user name, wherein the client user comprises a given server user, and wherein the client user name comprises a given server user name.

16. The computer program product according to claim 15, and comprising computer readable program code executing on the LDAP server and configured to define multiple server groups, each of the server groups comprising a given server role and a given server domain wherein each of the one or more client groups comprises a given server group, and to define the LDAP user table comprising multiple entries, each of the entries comprising a given server user name, a given server role and a given server domain.

17. The computer program product according to claim 16, and comprising computer readable program code executing on the LDAP server and configured, upon receiving the client user name from the LDAP client, to identify one or more of the entries whose server user name matches the client user name, the one or more identified entries having respective one or more server groups, and to convey the respective one or more server groups to the LDAP client, wherein the received one or more client groups comprises the one or more conveyed server groups.

* * * * *